(12) United States Patent
de Graaff et al.

(10) Patent No.: US 12,037,112 B2
(45) Date of Patent: Jul. 16, 2024

(54) HINGE STRUCTURE

(71) Applicant: FOKKER AEROSTRUCTURES BV, Hoogeven (NL)

(72) Inventors: Theo de Graaff, Hoogeven (NL); Jos Thoolen, Hoogeven (NL)

(73) Assignee: FOKKER AEROSTRUCTURES BV, Hoogeven (NL)

( * ) Notice: Subject to any disclaimer, the term of this patent is extended or adjusted under 35 U.S.C. 154(b) by 266 days.

(21) Appl. No.: 17/602,004

(22) PCT Filed: Apr. 17, 2020

(86) PCT No.: PCT/EP2020/060856
§ 371 (c)(1),
(2) Date: Oct. 7, 2021

(87) PCT Pub. No.: WO2020/212568
PCT Pub. Date: Oct. 22, 2020

(65) Prior Publication Data
US 2022/0212778 A1 Jul. 7, 2022

(30) Foreign Application Priority Data
Apr. 18, 2019 (GB) .................................... 1905550

(51) Int. Cl.
*B64C 3/18* (2006.01)
*B23B 35/00* (2006.01)
*B23P 23/02* (2006.01)
*B64C 9/00* (2006.01)
*B64C 9/02* (2006.01)
*B64F 5/10* (2017.01)

(52) U.S. Cl.
CPC .............. *B64C 3/185* (2013.01); *B23B 35/00* (2013.01); *B23P 23/02* (2013.01); *B64F 5/10* (2017.01); *B64C 2009/005* (2013.01); *B64C 9/02* (2013.01)

(58) Field of Classification Search
CPC ... B64C 3/18; B64C 3/185; B64C 9/02; B23P 23/02; B23B 2215/04; B23B 35/00
See application file for complete search history.

(56) References Cited

U.S. PATENT DOCUMENTS 5,224,670 A * 7/1993 Padden ..................... B64C 3/20
244/123.3
7,229,049 B2 * 6/2007 Ambrose .................. B64C 9/02
244/213

(Continued)

FOREIGN PATENT DOCUMENTS

EP 3342513 A1 7/2018
WO 2006076018 A2 7/2006

OTHER PUBLICATIONS

International Search Report and Written Opinion mailed Jul. 22, 2020 for PCT/EP2020/060856 (10 pages).
(Continued)

*Primary Examiner* — Joshua J Michener
*Assistant Examiner* — Arfan Y. Sinaki
(74) *Attorney, Agent, or Firm* — Bejin Bieneman PLC

(57) ABSTRACT

A spar structure can connect a moveable component to an aircraft. The structure is formed from a single continuous body of material defining a plurality of attachment/actuation brackets and a pair of continuous hinge lines extending through the body.

5 Claims, 6 Drawing Sheets

(56) References Cited

U.S. PATENT DOCUMENTS

| | | |
|---|---|---|
| 2001/0017336 A1* | 8/2001 | Hirahara .................. B64C 3/18 244/123.7 |
| 2002/0100840 A1 | 8/2002 | Billinger |
| 2004/0145080 A1* | 7/2004 | Tanaka .................. B29C 70/443 264/258 |
| 2009/0072090 A1* | 3/2009 | Kallinen ................. B64C 9/323 244/131 |
| 2009/0127406 A1 | 5/2009 | McDonald |
| 2014/0175216 A1 | 6/2014 | Ishihara |
| 2017/0225767 A1* | 8/2017 | King ....................... B64C 3/187 |
| 2017/0225769 A1* | 8/2017 | Carlson .................... B32B 7/12 |
| 2017/0225770 A1* | 8/2017 | Kooiman .................. B64F 5/10 |
| 2018/0021880 A1* | 1/2018 | Maziarz ............... B23K 20/129 228/114 |
| 2018/0155004 A1* | 6/2018 | Woolcock ................ B64C 3/26 |
| 2020/0115031 A1* | 4/2020 | Evans ....................... B64C 3/26 |

OTHER PUBLICATIONS

UKIPO Office Action for Application No. GB1905550.8 mailed Jun. 11, 2021 (3 pages).
UKIPO Combined Search and Examination Report under Sections 17 and 18(3) mailed Oct. 8, 2019 for Application No. GB1905550.8 (5 pages).

* cited by examiner

HINGE STRUCTURE

CROSS-REFERENCE TO RELATED APPLICATIONS

This application is a national stage of, and claims priority to, Patent Cooperation Treaty Application No. PCT/EP2020060856, filed on Apr. 17, 2020, which application claims priority to Great Britain Application No. GB 1905550.8, filed on Apr. 18, 2019, which applications are hereby incorporated herein by reference in their entireties.

BACKGROUND

Moveable structures on aircraft include flaps, ailerons, tail wings and various other components arranged, in use, to guide or control airflow over an aircraft structure. Ailerons, as one example, are coupled to the main wing structure by means of hinge arrangements allowing the aileron to be rotated about a pivot to change the flow direction of air.

Actuators, such as hydraulic pumps, worm gears or the like, are used to pivot and move the moveable structures about the hinge thereby changing the aerodynamic performance and characteristics of the structure and wing. This allows for controlled aircraft flight by movement of the structure.

Accurate alignment of the hinges and the connecting brackets which connect the moveable structures to the wing is critical in allowing the moveable structure to be accurately and reliably controlled. Inaccuracies in the alignment of a hinge can cause jamming or restrictions in movement which can be critical to the safe operation and flight of an aircraft.

To prevent any such issues, conventional moveable surface hinges are manufactured by carefully drilling a shaft or hole through each of the components forming the connection and then assembling the components in a specifically manufacturing jig. The jig ensures precise alignment of all of the components as they are attached together to form the hinge and the actuator attachments. Any misalignment of the hinges and brackets can be compensated for by further machining or by shimming or fettling the parts.

However, current manufacturing methods present some drawbacks in that they are extremely labour intensive resulting in high manufacturing costs, high rejection rates and slow manufacturing. Variable results in manufacturing also result in high levels of component reworking and concessions.

Furthermore, efficient maintenance of aircraft can be prevented by inconsistencies in hinge manufacturing making replacing moveable aircraft structures both time consuming, unreliable and expensive. Any misalignment when attempting to replace a hinged component will prevent the component being replaced and will require further labour intensive work to align the hinge.

The drawbacks of conventional manufacturing techniques are compounded when applied in modern aircraft design with increasing wingspans and size of moveable structure. Additionally, the speed with which maintenance of aircraft must be performed (to allow for economical operation of aircraft) is high and delays in maintenance can be significant issues for aircraft operators.

SUMMARY

The present disclosure is concerned with manufacturing a hinged connection between an aircraft moveable surface and an aircraft structure, and an integrated hinged coupling arrangement between an aircraft moveable surface and an aircraft structure. The present unconventional hinge arrangement and corresponding manufacturing method provides a superior hinge connection for an aircraft moveable structure with greater accuracy and reliability and which allows for economical and reliable in-situ repairs of aircraft including, for example, on an airfield.

Viewed from a first aspect there is provided a spar structure for connecting a moveable component to an aircraft, the spar structure comprising a continuous body of material defining a plurality of attachment/actuation brackets and a pair of continuous hinge lines extending through the body.

Thus, the spar structure described herein is formed as a unitary part or component that is a single continuous component as opposed to a composition of a number of individual components. Owing to the need for precise alignment of each bracket, complex jigs are conventionally used incorporating skims or shims which are used to achieve the precision needed for alignment of the hinges.

Forming the spar from a single body of material is counterintuitive because of the perception and accepted convention in the industry that the jig arrangement provides for the greatest tolerance control.

As described herein the pair of continuous hinge lines define the datum for the attachment/actuation bracket locations, i.e., instead of making a bracket and positioning it with extreme accuracy around a hinge line this disclosure adopts an opposite approach, namely, to use the hinge lines as the datum and to form the brackets around those two datum lines.

Although extensive machining is required, the removed material can be recycled and computer numerically controlled machines (CNC Machines) can be conveniently programmed to continuously form the spar structure according to a predetermined programme.

Furthermore, the structure strength and rigidity can be optimised and areas which would otherwise have acted as stress raisers can be designed out of the structure. Still further, no (or fewer) rivets, connectors or other couplings are needed between the brackets and the spar. They become fully integrated.

Advantageously one of the pair of hinge lines may intersect with a first group of said attachment/actuation brackets and a second of said hinge lines may intersect with a second group of said attachment/actuation brackets. Adjacent brackets need not be for the same purpose and structural redundancy can be built into the spar should any one bracket fail in any way.

Specifically, the first group of attachment/actuation brackets may be brackets arranged in use to pivotally mount the moveable component to an aircraft structure. This defines the line or axis around which the movable component rotates, e.g., the aileron.

Similarly, the second group of attachment/actuation brackets may be brackets arranged in use to couple the spar structure to an actuator. The actuator, for example a linear actuator or similar, can thus be coupled to the spar structure. Movement of the second group of brackets by means of the actuator causes the rotation of the spar (and moveable component) around the axis or hinge line described above.

Thus, by means of the pair of hinge lines extending through the body and intersecting with two groups of brackets the spar can be both securely coupled to the wing (for example) and simultaneously allowed to rotate in response to selective control of the actuator.

Advantageously each of the hinge lines may define a cylindrical bore through each attachment/actuation bracket they intersect with. Thus, each bracket that intersects with the hinge line will be in perfect alignment with the lengthwise hinge line passing through the spar.

The spar may be formed of any suitable structural shape. In one arrangement the structure may comprise an outer generally U-shaped body. The attachment/actuation brackets may be formed within the generally U-shaped body. Thus, the U-shaped body provides structural rigidity and the internally arranged brackets enhance the rigidity. The open face of the U-shaped body conveniently provides a surface through which the brackets can extend. A compact shape may thus be provided.

The spar may be arranged to couple to the moveable component itself by any suitable arrangement. This may, for example, be by conventional rivets, glue or other fastening means. The spar may then be formed as a single component and then be selectively coupled to the moveable component. It may alternatively be permanently connected to the moveable component making maintenance simpler.

Viewed from another aspect, there is provided an aircraft structure arranged in use to be connected to an aircraft via a hinge and comprising a spar structure described herein.

The aircraft structure may be selected from the non-exhaustive list of aileron, flap, rudder or wing component.

It will be recognised from the present teaching that the structure may be advantageously machined from a single block or billet of material. In an alternative approach additive manufacturing techniques could be used to form the spar, for example one of the following technique could be used:
Powder bed fusion methods
Direct metal laser sintering (DMLS)
Electron beam melting (EBM)
Selective laser melting (SLM)
Selective laser sintering (SLS)
Direct metal wire deposition
Direct metal powder deposition Viewed from another aspect there is provided a method of manufacturing a spar structure for connecting a moveable component to an aircraft, the spar structure comprising a continuous body of material defining a plurality of attachment/actuation brackets and a pair of continuous hinge lines extending through the body, the method comprising the steps of:
(A) drilling a pair of elongate bores into a block or billet of material to define the pair of continuous hinge lines; and
(B) machining the block or billet of material according to a predetermined machining profile to form the spar structure around the pair of continuous hinge lines.

Machining the holes prior to machining the spar advantageously makes the all important hinge lines the datum of the component. The body of the spar structure can be built around the hinge lines maintaining their precision and integrity.

The bores or holes may be formed by any suitable drilling technique. Advantageously a deep hole drilling process may be used. For example, a gun-drilling process may be used to provide highly accurate bores. Advantageously the gun-drilling process allows lengthy bores to be formed with high length to diameter ratios. This allows the pair of holes to be drilled along the length of even a long billet of material prior to machining the spar body.

To still further improve the accuracy of the drilling process the block or billet of material may be caused to counter-rotate relative to the direction of rotation of the drilling process during the drilling process.

DRAWINGS

Aspects of the disclosure will now be described, by way of example only, with reference to the accompanying figures in which.

Figure 1:
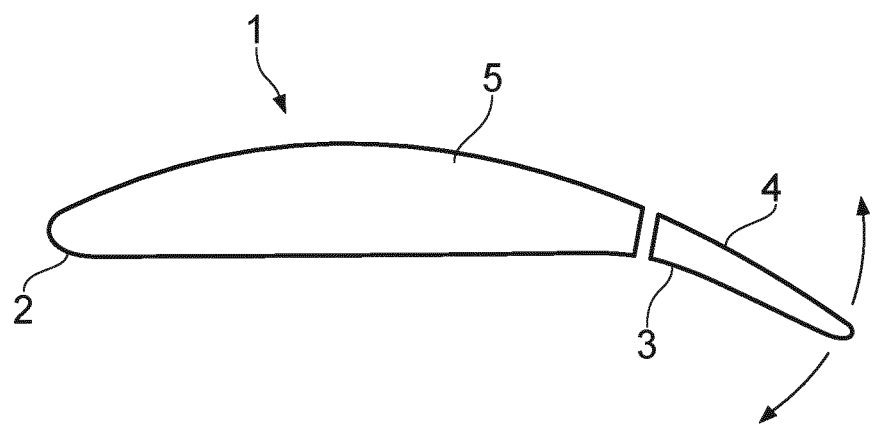
FIG. 1 shows a schematic of a moveable structure of an aircraft wing.

While the claimed invention is susceptible to various modifications and alternative forms, specific embodiments are shown by way of example in the drawings and are herein described in detail. It should be understood however that drawings and detailed description attached hereto are not intended to limit the invention to the particular form disclosed but rather the invention is to cover all modifications, equivalents and alternatives falling within the spirit and scope of the claimed invention It will be recognised that the features of the aspects of the invention(s) described herein can conveniently and interchangeably be used in any suitable combination. It will also be recognised that the disclosure covers not only individual embodiments but also combinations of the embodiments that have been discussed herein.

DETAILED DESCRIPTION

FIG. 1 is a schematic end view of an aircraft wing 1 viewed in cross-section towards the fuselage of the aircraft. The wing comprises a leading edge 2 and a trailing edge 3. FIG. 1 illustrates one example of a moveable structure on a conventional aircraft. The structure shown is an aileron 4 which is movable about a pivot proximal to the trailing edge of the main wing box 5. The arrows illustrate how the aileron can then be moved about the pivot. Movement causes the distal part of the aileron from the pivot to move in an arc which in the case of the aileron allows the aircraft to roll and turn.

FIG. 1 represents just one location of a moveable component on an aircraft structure. Other examples include wing flaps, the tail wings, tail rudder and even the landing gear doors. It will be recognized that the arrangements and methods described herein can be applied to any hinged arrangement for an aircraft structure.

Figure 2:
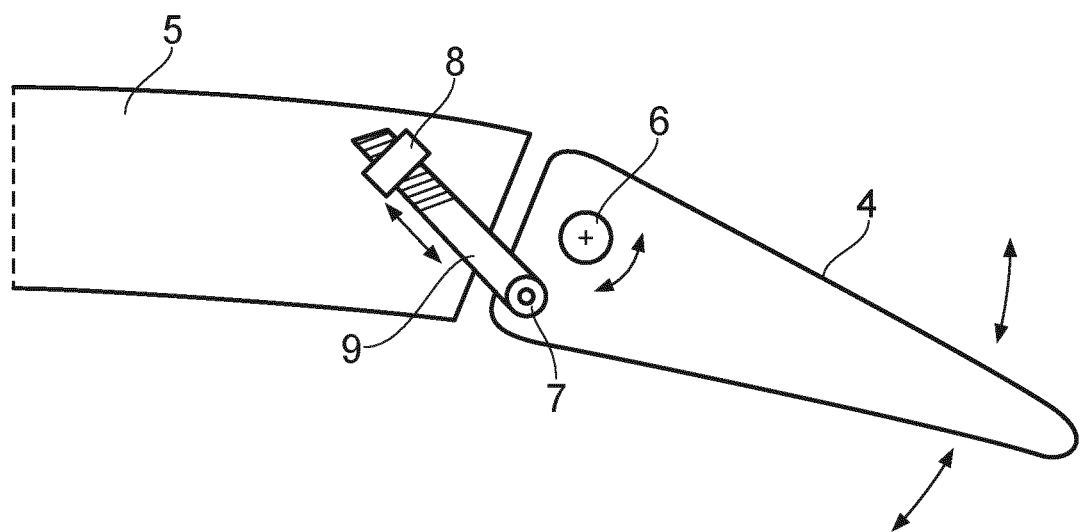
FIG. 2 shows a pivot and actuator arrangement for a moveable structure.

FIG. 2 is a cross-section through the pivot connection of the aileron in FIG. 1. The aileron 4 is rotatably mounted to a pivot 6. The pivot 6 extends along the aileron as described below. Movement of the aileron 4 about the pivot 6 causes the aileron to move in an arc in the direction of the arrows.

The aileron is provided with a second pivot 7 which is coupled to an actuator 8 comprising and extendable rod or arm 9 which can extend or retract in the direction of the arrows shown. The actuator 8 and arm 9 may be any suitable combination for use on an aircraft. One example is a hydraulic pump driving a threaded rod. Thus, rotation of the drive causes movement of the rod. Because the pivot 6 and pivot 7 are offset movement of the rod 9 causes movement of the aileron about the pivot 6. The actuator and rod are housed within the wing box 5.

Figure 3:
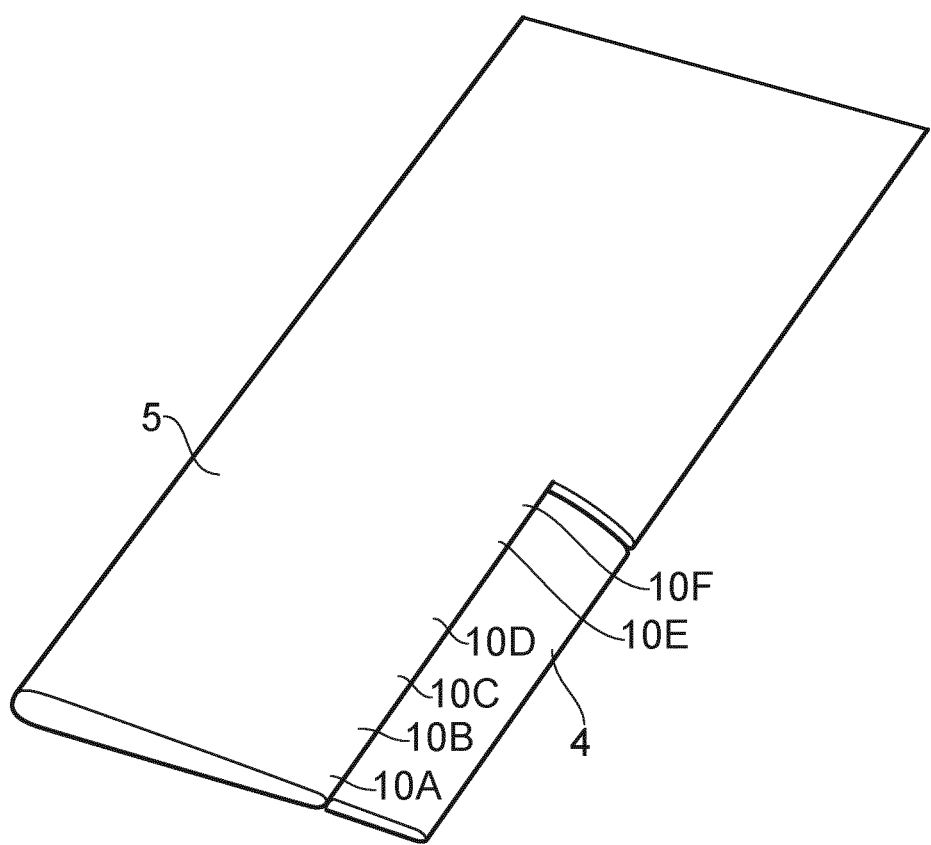
FIG. 3 shows a wing aileron and positions of actuation and hinge brackets.

FIG. 2 is a cross-section through one pivot and actuator arrangement. To support the aileron along its length (which could in some aircraft be in excess of 3 metres long) the hinge arrangement and actuator attachments need to be positioned at multiple points along the aileron/wing box. FIG. 3 illustrates a six point hinge coupling.

In FIG. 3 the aileron 4 is coupled to the wing box 5 at 6 discrete points 10A, 10B, 10C, 10D, 10E and 10F. Actuation points are not required at every position and so, as an example, the actuator points may be positions 10B and 10D and the remaining positions may be hinge or pivot points. This advantageously allows for redundancy in the hinge should one connection fail and further equally supports the aileron along its length.

As discussed above, the aileron may be in excess of 3 metres in length and so accurate alignment of the pivot line extending through each of the coupling points 10A to 10F is essential for the accurate operation of the aileron.

Conventionally, this precise alignment is achieved by positioning each of the brackets that form the pivot 6 connection and the actuator pivot 7 connection in a specially manufactured jig before assembly. A shaft can then be passed through each of the bores in the brackets to form the elongate pivot lines of pivot 6 and pivot 7.

However, as also set out above this is intensely time consuming and skill is needed to meet the required interchangeability (ICY) tolerances. Fettling and shimming techniques are used to ensure ICY compliance in a conventional arrangement.

Conventional connection arrangements as described above advantageously allow the separate hinge & actuator attachment brackets to be removed and repaired individually during service life (using a suitable jig to re-achieve the hinge line). Disadvantageously, the arrangements are labour intensive assembly tasks, resulting in high recurring cost, high parts count and manufacturing tolerance variables multiplied with number of separate parts.

The specifics of the alternative coupling arrangement will now be described.

Figure 4:
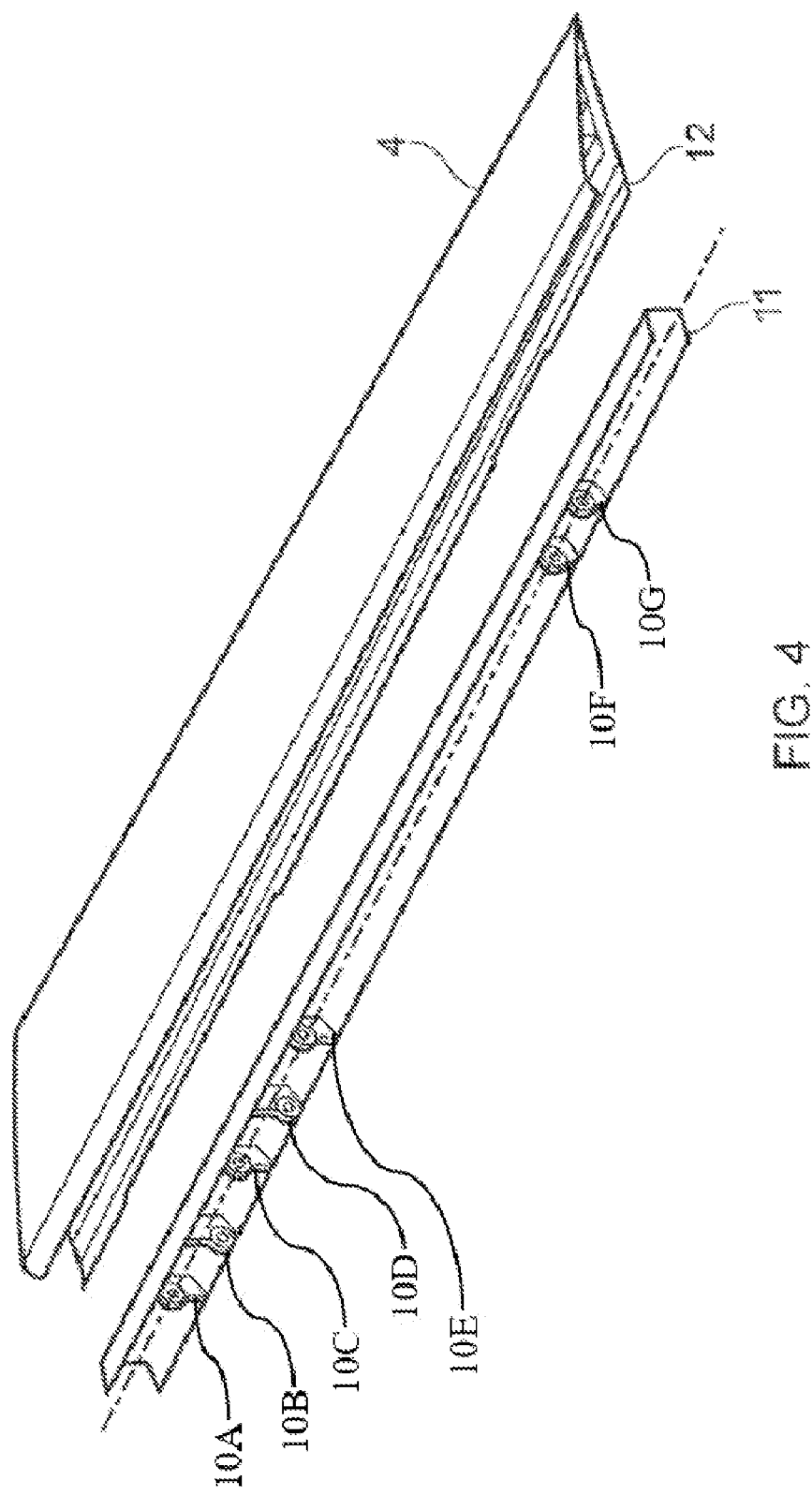
FIG. 4 shows an integrated spar and aileron.

FIG. 4 shows the integrated and continuous hinge coupling arrangement according to examples described herein. An integrated or continuous front spar 11 for the aileron 4 is provided.

The terms integrated/continuous are intended to refer to a component which is formed as a single body of material. Specifically, the integrated spar 11 may be formed by machining a single billet of material to form the body of the spar 11 and each of the hinge or actuator attachments 10A, 10B, 10C, 10D, 10E, 10F, 10G which allow the aileron to be both coupled to the wing box (not shown in FIG. 4) and also actuated to cause movement of the aileron relative to the wing box.

Alternatively, the integrated spar 11 may be formed using additive manufacturing techniques to form the spar 11 as a single unsegregated component incorporating a rigid outer body supporting the plurality of hinge and actuator brackets 10A, 10B, 10C, 10D, 10E, 10F, 10G.

FIG. 4 shows the integrated spar 11 and aileron separated. However, in use the spar 11 is coupled to the front edge 12 (the leading edge) of the aileron 4. The arrangement in FIG. 4 is configured to replicate the locations of the hinge and actuator attachment brackets shown in FIG. 3, namely connections 10A, 10B, 10C, 10D, 10E, 10F with the addition of a further hinge position 10G. The integrated spar 11 is a single component and may be coupled to the aileron leading edge in any suitable way.

Figure 5:
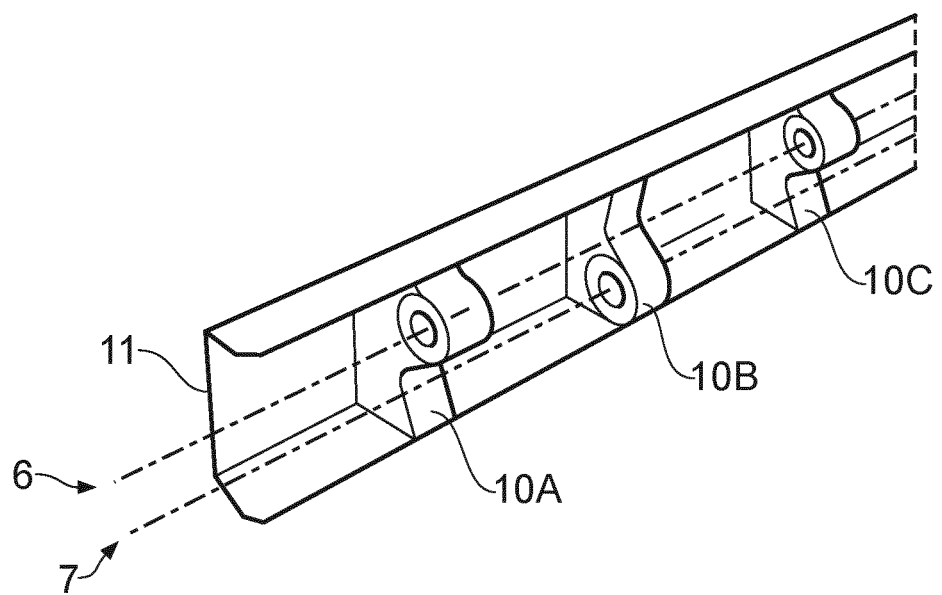
FIG. 5 shows a closer view of the integrated spar of FIG. 4.

FIG. 5 shows the integrated spar 11 in more detail at one end. The hinge and actuator brackets can be seen to replicate the couplings 10A, 10B and 10C shown in FIG. 3.

FIG. 5 also illustrates the spatial separation of the two hinge lines 6 and 7. Pivot line 6 represents the pivot line of the aileron and pivot line 7 represents the pivot of the actuator connection. It will be recognised that the shaft passing through the pivot line 7 (connecting the actuator to the integrated spar) will itself rotate about the pivot line 6 as the actuation occurs.

Any suitable configuration of hinge brackets and actuation brackets can be positioned along the length of the integrated spar just as in a conventional connection arrangement.

As stated above the integrated spar 11 may be advantageously formed form a single billet of material. Using a suitable CNC milling machine a billet of aluminium (as one example) may be machined to create the integrated spar. Machined material can be recycled optimising material usage and additionally the spar geometry can be optimised for rigidity and strength.

Advantageously this integrated spar arrangement overcomes the disadvantage of manufacturing the current assembled hinge & actuator attachment brackets, by machining all required attachment brackets in a single bracket. The required attachment brackets (also called lugs/clevises) are then machined as integrated features. This process removes the requirement for complex drill/ream support if the process were reversed, as would be normal practise.

Furthermore, the arrangement provides for a reduction in assembly time and associated costs to achieve the required hinge line tolerances.

Thus, a fully integrated spar is provided. It will be recognised that this disclosure extends to a method of manufacturing such an integrated spar arrangement from a single billet of material or using an additive manufacturing technique.

It has further been established that the approach described above allows for a still further advantageous manufacturing approach to be used, as will be described below. Specifically, before machining the billet to form the brackets and structure of the integrated spar highly accurate hinge or pivot lines can be achieved by pre-drilling these in the billet in advance of the machining operation described above. This is illustrated with reference to FIG. 6.

Figure 6:
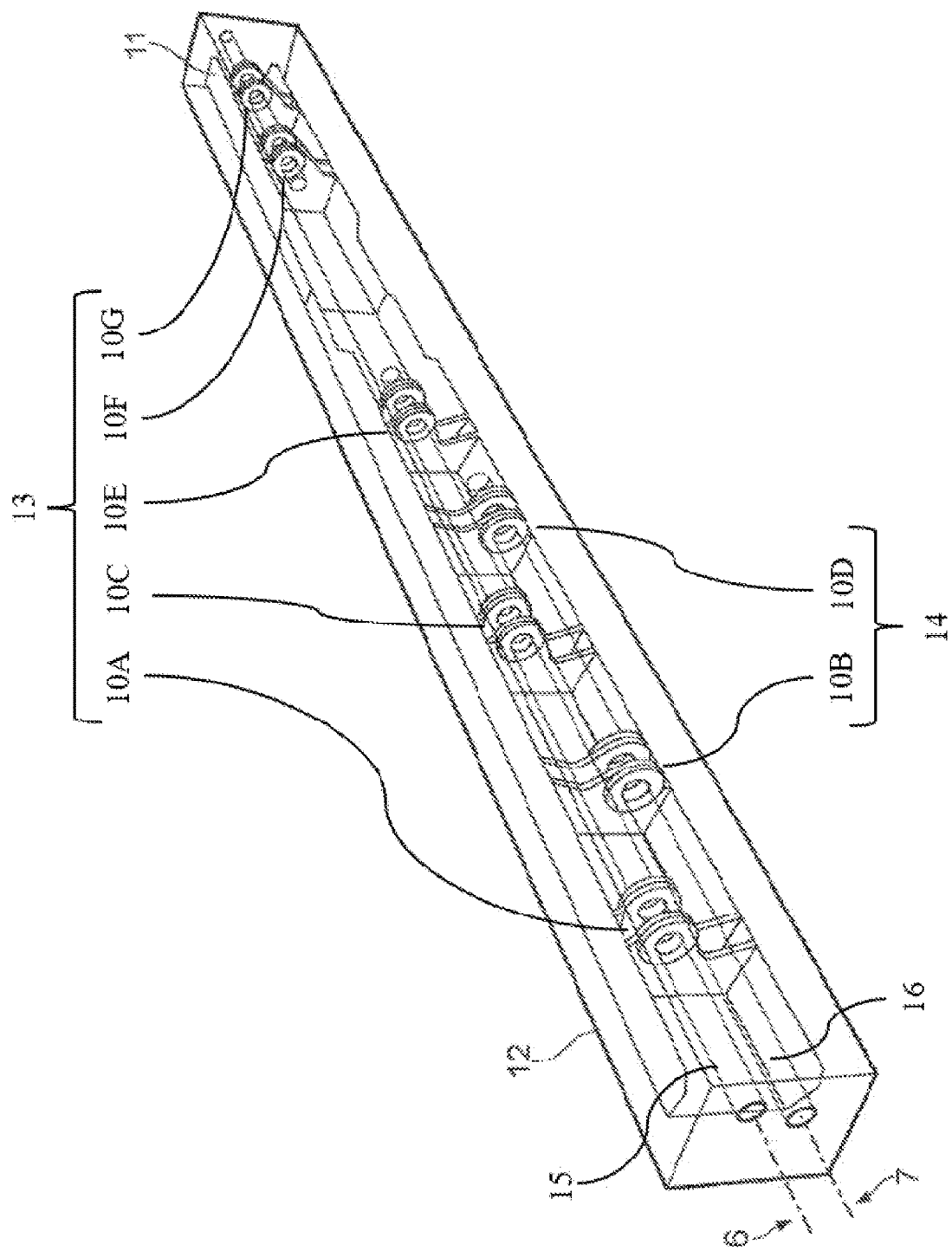
FIG. 6 shows a billet, integrated spar and pivot lines.

The integrated spar 11 is shown in FIG. 6 within the surrounding billet 12. The billet is a continuous block of material from which the spar 11 can be machined as described above.

Advantageously before performing the machining to form the spar an unconventional approach can be adopted of first drilling the long holes or bores that will form the pivot lines 6 and 7 shown in FIG. 6. Once the bores are formed the integrated spar can then be machined. In effect a multi-stage process is performed—first form the pivots and then form the structure around the pivot lines.

Advantageously one of the pair of hinge lines 6 may intersect with a first group 13 of said attachment/actuation brackets 10A, 10C, 10E, 10F, 10G and a second of said hinge lines 7 may intersect with a second group 14 of said attachment/actuation brackets 10B, 10D. Adjacent brackets need not be for the same purpose and structural redundancy can be built into the spar should any one bracket fail in any way.

Specifically, the first group of attachment/actuation brackets 13 may be brackets 10A, 10C, 10E, 10F, 10G arranged in use to pivotally mount the moveable component to an aircraft structure. This defines the line or axis 6 around which the movable component rotates, e.g., the aileron.

Similarly, the second group of attachment/actuation brackets 14 may be brackets 10B, 10D arranged in use to couple the spar structure to an actuator. The actuator, for example a linear actuator or similar, can thus be coupled to the spar structure 11. Movement of the second group of brackets 14 by means of the actuator causes the rotation of the spar 11 (and moveable component) around the axis or hinge line 7 described above.

Thus, by means of the pair of hinge lines 6, 7 extending through the body and intersecting with two groups of brackets 13, 14 the spar 11 can be both securely coupled to the wing (for example) and simultaneously allowed to rotate in response to selective control of the actuator.

Advantageously each of the hinge lines 6, 7 may define a cylindrical bore 15, 16 through each attachment/actuation bracket 10A, 10B, 10C, 10D, 10E, 10F, 10G they intersect with. Thus, each bracket 10A, 10B, 10C, 10D, 10E, 10F, 10G that intersects with the hinge line 6, 7 will be in perfect alignment with the lengthwise hinge line 6, 7 passing through the spar 11.

Such an approach provides a highly accurate and continuous pivot line around which the brackets can be created without interrupting the precision of the pivot lines. As shown in FIG. 6 the bores need not extend through the entire length of the billet; they only need extend as far as the last bracket using the pivot line. This approach can be applied on all aircraft movable surfaces requiring a tight hinge line tolerance.

Advantageously the bores forming the pivot lines 6, 7 may be formed using a deep drilling process such as a gun drilling process. This allows a bore to be formed that has a high length to diameter ratio as is the base with the pivot line in an aircraft moveable structure hinge.

The gun drilling process involves supplying a coolant along the centre of the drill bit which acts to simultaneously cool the cutting surface and carry the swarf (waste material from the cutting zone) back along the bore and out of the component. Extremely deep holes can be drilled.

Advantageously to still further improve the accuracy of the pivot lines the billet may be counter-rotated about the gun drill axis of rotation. This advantageously maintains an extremely accurate drilled hole and improves the drilling operation. In such a manufacturing process the billet may be first positioned in a jig that allows for rotation about the gun drill axis to form the first pivot line 6 and then the same process can be repeated to form the second pivot line 7, i.e., by rotating the billet about the pivot line 7 during the drilling process. In each case the pivot line acts as the datum about which the billet is rotated. Specifically, using the counter-rotating approach allows tolerances in excess of $1/10^{th}$ of a mm which are desirable in the current application.

The manufacturing process and resulting integrated spar provide a single discrete hinge component which has a highly accurate pair of hinge lines to receive the hinge brackets and actuation brackets of the aileron (or other moveable hinged structured). The fact that no alignment of brackets is required means that when attached to a component such as an aileron, the aileron can be replaced with a high level of accuracy, minimal tooling and in a highly efficient manner. This not only provides for efficient routine maintenance of the aircraft but also conveniently allows for rapid repair out of a hangar, for example on the airfield or the like. The arrangement negates the need for complex and expensive jigs and provides a component which can be readily recycled.

To safely install the component all that is required if for the component to be brought to the same temperature as the wing (to avoid any thermal expansion issues) and then installed.

It will be recognised that this disclosure extends to a moveable hinged structure for an aircraft incorporating an integrated spar described herein and specifically to an aircraft aileron comprising a leading edge integrated spar as described herein.

The invention claimed is:

1. A method of manufacturing a spar structure for connecting a moveable component to an aircraft, the spar structure comprising a continuous body of material defining a plurality of attachment and actuation brackets and a pair of continuous hinge lines extending through the body, the method comprising the steps of:
   (A) drilling a pair of elongate bores into a block or billet of material to define the pair of continuous hinge lines; and
   (B) machining the block or billet of material according to a predetermined machining profile to form the spar structure around the pair of continuous hinge lines.

2. The method of claim 1, wherein drilling the pair of elongate bores includes a deep hole drilling process.

3. The method of claim 2, wherein the deep drilling process is a gun-drilling process.

4. The method of claim 2, wherein the block or billet of material is caused to counter-rotate relative to a direction of rotation of the drilling process during the drilling process.

5. The method of claim 2, further comprising including the spar structure in an aircraft wing.

* * * * *